United States Patent
Zhou (10) Patent No.: US 10,659,412 B2
(45) Date of Patent: May 19, 2020

(54) METHOD AND DEVICE FOR SAVING CHAT RECORD OF INSTANT MESSAGING

(71) Applicant: ALIBABA GROUP HOLDING LIMITED, Grand Cayman (KY)

(72) Inventor: Jingwen Zhou, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 125 days.

(21) Appl. No.: 15/661,239

(22) Filed: Jul. 27, 2017

(65) Prior Publication Data
US 2017/0324692 A1 Nov. 9, 2017

Related U.S. Application Data

(63) Continuation of application No. PCT/CN2016/072771, filed on Jan. 29, 2016.

(30) Foreign Application Priority Data
Feb. 4, 2015 (CN) .......................... 2015 1 0059702

(51) Int. Cl.
| | | |
|---|---|---|
| *G06F 15/16* | (2006.01) | |
| *H04L 12/58* | (2006.01) | |
| *G06F 16/22* | (2019.01) | |
| *G06F 16/955* | (2019.01) | |

(52) U.S. Cl.
CPC .............. *H04L 51/16* (2013.01); *G06F 16/22* (2019.01); *G06F 16/9558* (2019.01); *H04L 51/00* (2013.01); *H04L 51/046* (2013.01)

(58) Field of Classification Search
CPC ....... H04L 51/16; H04L 51/00; H04L 51/046; G06F 16/22; G06F 16/9558

USPC .......................................................... 709/206
See application file for complete search history.

(56) References Cited

U.S. PATENT DOCUMENTS

| | | | |
|---|---|---|---|
| 7,779,353 B2* | 8/2010 | Grigoriu .............. | G06F 17/273 |
| | | | 715/243 |
| 7,814,425 B1 | 10/2010 | O'Shaugnessy et al. | |
| 9,565,148 B2 | 2/2017 | Ku et al. | |
| 9,584,463 B2 | 2/2017 | Ji et al. | |
| 2003/0041092 A1 | 2/2003 | Woo | |

(Continued)

FOREIGN PATENT DOCUMENTS

| | | |
|---|---|---|
| CN | 102054033 A | 5/2011 |
| CN | 103067248 A | 4/2013 |

(Continued)

OTHER PUBLICATIONS

Chinese First Search dated Mar. 20, 2018, issued in Chinese Application No. 201510059702.1 (2 pages).

(Continued)

*Primary Examiner* — Sm A Rahman
(74) *Attorney, Agent, or Firm* — Sheppard Mullin Richter & Hampton LLP (57) ABSTRACT

A method for saving chat records of instant messaging (IM) includes when an instant message transmitted or received by an IM chat window comprises non-text information, acquiring a content summary of the non-text information, and saving the instant message, and saving the non-text information as a data object comprising the non-text information and the content summary of the non-text information.

9 Claims, 2 Drawing Sheets

(56) References Cited

U.S. PATENT DOCUMENTS

| | | |
|---|---|---|
| 2004/0117367 A1 | 6/2004 | Smith et al. |
| 2005/0021624 A1 | 1/2005 | Herf et al. |
| 2005/0240943 A1* | 10/2005 | Smith .................... G06F 9/465 |
| | | 719/328 |
| 2006/0112167 A1* | 5/2006 | Steele .................... H04L 29/06 |
| | | 709/206 |
| 2006/0195506 A1 | 8/2006 | Deng |
| 2007/0143423 A1 | 6/2007 | Kieselbach et al. |
| 2007/0271340 A1 | 11/2007 | Goodman et al. |
| 2008/0161045 A1* | 7/2008 | Vuorenmaa ......... G06F 16/9558 |
| | | 455/556.1 |
| 2008/0201437 A1 | 8/2008 | Ludwig et al. |
| 2009/0030919 A1 | 1/2009 | Brezina et al. |
| 2009/0042622 A1 | 2/2009 | Tsui et al. |
| 2009/0235150 A1* | 9/2009 | Berry .................... G06F 16/48 |
| | | 715/205 |
| 2009/0307325 A1 | 12/2009 | Szeto |
| 2010/0064018 A1 | 3/2010 | Luo |
| 2010/0070899 A1 | 3/2010 | Hunt et al. |
| 2010/0159883 A1 | 6/2010 | Pascal et al. |
| 2010/0223095 A1 | 9/2010 | Ranta |
| 2012/0072855 A1 | 3/2012 | Baldwin et al. |
| 2013/0002647 A1* | 1/2013 | Bacus .................... G06T 15/00 |
| | | 345/419 |
| 2013/0067304 A1 | 3/2013 | Peng et al. |
| 2013/0191384 A1 | 7/2013 | DeMattei |
| 2013/0219276 A1 | 8/2013 | Shan |
| 2013/0304836 A1 | 11/2013 | Ku et al. |
| 2014/0095964 A1 | 4/2014 | Mayblum et al. |
| 2014/0317207 A1 | 10/2014 | Ji et al. |

FOREIGN PATENT DOCUMENTS

| | | |
|---|---|---|
| CN | 104022943 A | 9/2014 |
| CN | 104375997 A | 2/2015 |
| JP | 2004-070809 A | 3/2004 |
| JP | 2005-267229 A | 9/2005 |
| JP | 2007-172625 A | 7/2007 |
| JP | 2007-518146 A | 7/2007 |
| JP | 2013-526752 A | 6/2013 |
| JP | 2013-546052 A | 12/2013 |
| JP | 2014-505299 A | 2/2014 |
| WO | 2011/077501 A1 | 6/2011 |

OTHER PUBLICATIONS

Korean Office Action dated Jun. 21, 2018, issued in Korean Application No. 10-2017-7024552 (8 pages).

PCT International Preliminary Report on Patentability dated Aug. 17, 2017, issued in International Application No. PCT/CN2016/072771 (10 pages).

"kakaolink (kakotalk and kakostory sharing) script update", http://nubiz.tistory.com/465, Jun. 12, 2014 (2 pages).

Search Report for European Application No. 16746109.4 dated Jun. 11, 2018, 6 pages.

First Office Action dated Aug. 28, 2018, issued in related Japanese Application No. 2017-541046 (8 pages).

Notice of Final Rejection dated Nov. 27, 2018, issued in related Korean Application No. 10-2017-7024552 (4 pages).

First Office Action dated Apr. 4, 2018, issued in related Chinese Application No. 201510059702.1 (6 pages).

Second Office Action dated Nov. 2, 2018, issued in related Chinese Application No. 201510059702.1 (12 pages).

Examination Report for European Application No. 16746109.4 dated May 6, 2019 (5 pages).

Final Office Action for Japanese Application No. 2017-541046 dated May 28, 2019 (6 pages).

Summons to attend oral proceedings for European Application No. 16746109.4 mailed on Dec. 16, 2019 (5 pages).

International Search Report and Written Opinion for International Application No. PCT/CN2016/072771, dated Apr. 15, 2016, 10 pages.

* cited by examiner

METHOD AND DEVICE FOR SAVING CHAT RECORD OF INSTANT MESSAGING

CROSS-REFERENCE TO RELATED APPLICATIONS

This application is a continuation application of International Application No. PCT/CN2016/072771, filed on Jan. 29, 2016, which claims priority to and benefits of Chinese Patent Application No. 201510059702.1 filed on Feb. 4, 2015. The contents of the above-referenced applications are incorporated herein by reference in their entirety.

TECHNICAL FIELD

The present application relates to the field of network technologies, and in particular to a method and a device for saving chat records of instant messaging (IM).

BACKGROUND

With the rapid development of network technologies, IM has become a common way of communications over networks. When users use an IM tool to chat, a server would automatically save messages transmitted and received by an IM chat window to form chat records, which are saved on a client device in the form of files. IM tools typically provide a function for searching historical messages. When a user needs to review a historical message, he/she just needs to retrieve a corresponding file of chat records, type in a corresponding keyword, and then can acquire the desired historical message.

In the prior art, however, only plain text information transmitted or received by users can be searched. During chatting, a user can type in or receive non-text information, such as URL (Uniform Resource Locator), sharing of account information, photos, or audio or video files. It is impossible for the user to search this type of non-text information.

SUMMARY

The present application provides a method, a device and a server for saving IM chat records, so as to solve the problem in the prior art. According to an aspect of an embodiment of the present application, a method for saving IM chat records is provided. The method comprises: when an instant message transmitted or received by an IM chat window comprises non-text information, acquiring a content summary of the non-text information; saving the instant message, and saving the non-text information as a data object comprising the non-text information and the content summary of the non-text information.

According to another aspect of an embodiment of the present application, a device for saving IM chat records is provided. The device comprises: an acquisition unit configured to acquire, when an instant message transmitted or received by an IM chat window comprises non-text information, a content summary of the non-text information; and a saving unit configured to save the instant message, and save the non-text information as a data object comprising the non-text information and the content summary of the non-text information.

The present application further provides a non-transitory computer-readable storage media storing instructions that, when executed by a processor, cause the processor to perform a method comprising when an instant message transmitted or received by an IM chat window comprises non-text information, acquiring a content summary of the non-text information, and saving the non-text information as a data object comprising the non-text information and the content summary of the non-text information.

In an embodiment of the present application, when an instant message transmitted or received by an IM chat window comprises non-text information, a content summary of the non-text information is acquired; the non-text information is saved as a data object, and the data object comprises the non-text information and the content summary of the non-text information. When a user needs to acquire the non-text information by searching the chat records, he/she just needs to type some words in the content summary of the non-text information into a search box. As a result, the function of searching non-text information in chat records is realized and the problem in the prior art is solved.

DETAILED DESCRIPTION OF THE INVENTION

Exemplary embodiments will be described in detail herein, which are illustrated with the accompanying drawings. When the accompanying drawings are described below, the same numerals in different figures indicate the same or similar elements, unless otherwise described. The implementation manners described in the following exemplary embodiments do not represent all of the implementation manners consistent with the present application. On the contrary, they are merely examples of devices and methods that are described in detail in the appended claims and consistent with some aspects of the present application.

Terms in the present application are used only for the purpose of describing specific embodiments, not intended to limit the present application. "A", "said" and "the" used in the singular form in the present application and the appended claims are also intended to comprise the plural form, unless other meanings are clearly expressed in the context. It should be further understood that the term "and/or" used herein refers to any or all possible combinations of one or more associated items that are listed.

It should be understood that terms like first, second and third may be used in the present application to describe various information; however, the information should not be limited to these terms. These terms are merely used to differentiate information of the same type. For example, without departing from the scope of the present application, the first information may also be referred to as the second information, and similarly, the second information may also be referred to as the first information. Depending on the context, for example, the term "if" used herein may be interpreted as "when . . . ", "during . . . ", or "in response to determination that". The terms "include", "contain" or any other variations are intended to cover non-exclusive inclusions, so as to cause a process, method, commodity or device including a series of elements to not only include those elements, but also include other elements that are not listed specifically, or also include elements that are inherent in this process, method, commodity or device.

For the IM tools that are commonly used at present, chat records are saved in the plain text format. When searching the chat records, a user has to type corresponding words into a search box and acquire corresponding historical messages through word matching.

If a hyperlink, for example an URL or sharing of a public account, is transmitted or received by a user during a chat session, the server records the hyperlink information also in the plain text format. Assume that a current user receives, in a chat window, an IM message, which is an URL, specifically being http://www.sipo.gov.cn/zlsq/200804/t20080418_383686.html. The user clicks the URL to open the webpage of "Patent Application" of the website of the State Intellectual Property Office of the People's Republic of China. In the chat records of the user, the URL is saved in the text format, and the content of the text is the URL itself. If the user desires to acquire the URL by searching the chat records, the user must provide all or a part of the URL. However, a user could typically only remember the subject content (i.e. Patent Application) of the webpage that the URL points to, while it is very difficult to remember the URL itself. With respect to a conventional method for saving IM chat records, therefore, it would be very difficult to implement search of hyperlink information transmitted or received by a user.

On the other hand, if a user sends or receives photos or audio or video files during a chat session, only the photos or audio or video files themselves can be saved in the chat records of the user. With respect to a conventional method for saving IM chat records, therefore, it is impossible for the user to acquire photos or audio or video files that have been transmitted or received by searching the chat records.

Figure 1:
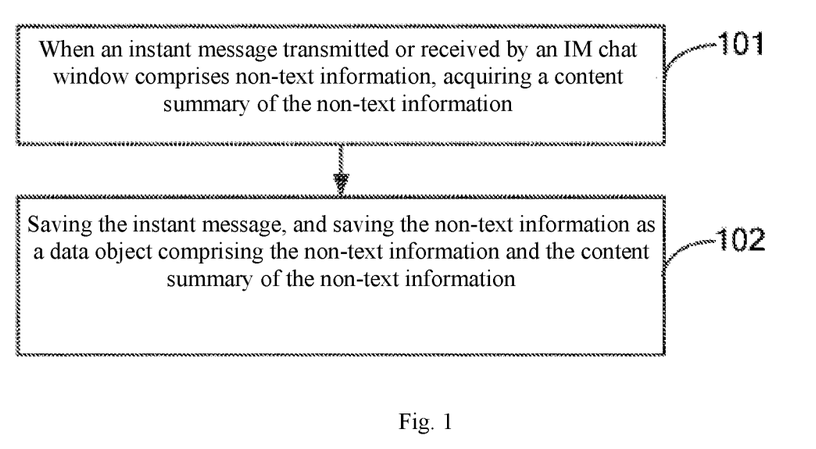
FIG. 1 is a flow chart of an embodiment of a method for saving IM chat records according to the present application.

In light of this, embodiments of the present application provide a method for saving IM chat records. Referring to FIG. 1, a flow chart of an embodiment of the method for saving IM chat records is provided according to the present application. As shown in FIG. 1, the method is run or applied on a server. The method comprises:

Step 101: when an instant message transmitted or received by an IM chat window comprises non-text information, acquiring a content summary of the non-text information.

Step 102: saving the instant message, and saving the non-text information as a data object comprising the non-text information and the content summary of the non-text information.

According to the method for saving IM chat records provided by the embodiment of the present application, non-text information transmitted or received by a user at an IM chat window is saved as a data object, and the data object comprises the non-text information and the content summary of the non-text information. When a user needs to acquire the non-text information by searching the chat records, he/she just needs to type some words in the content summary of the non-text information into a search box. As a result, the function of searching non-text information in chat records is realized and the problem in the prior art is solved.

The method for saving IM chat records according to an embodiment of the present embodiment will be described in detail below.

Figure 2:
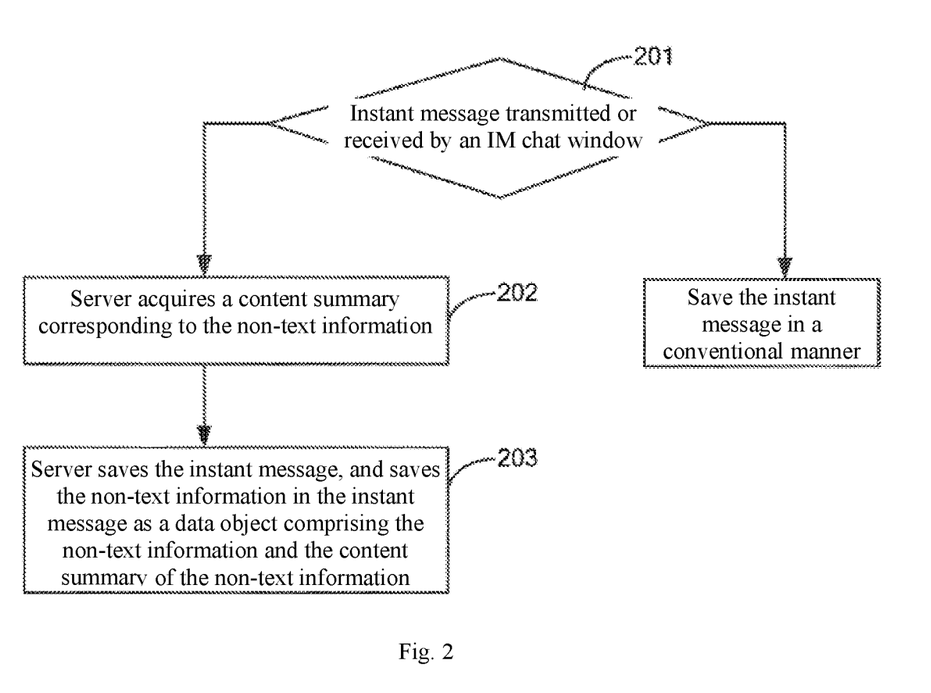
FIG. 2 is a flow chart of another embodiment of the method for saving IM chat records according to the present application.

Referring to FIG. 2, a flow chart of another embodiment of the method for saving IM chat records is provided according to the present application. The method can be run or applied on a server, and the method comprises the following steps:

Step 201: the server determines whether an instant message transmitted or received by an IM chat window comprises non-text information, and if yes, proceeds to Step 202; otherwise, saves the instant message in a conventional manner.

In the embodiment of the present application, a user initiates or receives IM by means of an IM software application installed on a client device. During a chat session, the user transmits or receives an instant message through an IM chat window, and the instant message may probably comprise non-text information. Specifically, the non-text information may comprise hyperlinks, photos, audio or video files, etc.

Herein, a hyperlink refers to a connection relationship that points from one object to a target. Such a target may be a webpage, or may be a part of the content on a webpage, for example, a photo, a file, or even an application.

In the embodiment of the present application, when the instant message comprises a hyperlink, the hyperlink information may be embodied in two ways. One is an absolute URL hyperlink. The URL is a full path of a website or webpage on a network. When the hyperlink comprised in the instant message is in the URL form, the instant message comprises full path information of a website or webpage, and a browser can be directly activated to access the webpage corresponding to the URL by clicking the URL.

The other one is a relative URL hyperlink, for example, a passage of words, a photo, or a clip of audio or video being linked to a website or webpage. At this time, the instant message comprises a passage of words, a photo, or a clip of audio or video, and the browser can also be directly activated to access a corresponding webpage by clicking the words, the photo, or the audio or video.

According to a conventional method for saving IM chat records, the conventional method is used to save chat records regardless whether an instant message transmitted or received by a user through an IM chat window comprises non-text information. Specifically, instant messages transmitted or received by the IM chat window are directly saved, in the plain text form, as chat records in a database.

In the embodiment of the present application, however, the server evaluates an instant message transmitted or received by the current IM chat window, and saves the instant message in a conventional manner when the instant message does not comprise non-text information, and comprises only plain text information. When the instant message comprises non-text information, on the other hand, the non-text information can be further processed before the instant message is saved.

Step 202: the server acquires a content summary corresponding to the non-text information.

In the embodiment of the present application, with respect to the non-text information comprised in the instant message, a content summary corresponding to the non-text information is acquired.

When the non-text information is a hyperlink, in some embodiments, the server activates a browser to access the webpage corresponding to the hyperlink and acquire a content summary of the webpage corresponding to the hyperlink.

Specifically, in some embodiments, assuming that an instant message currently transmitted or received by a user comprises a hyperlink, when the user clicks the hyperlink, the server activates a browser to access the webpage corresponding to the hyperlink, acquire information of the webpage corresponding to the hyperlink, and generate, according to the information of the webpage corresponding to the hyperlink, a content summary of the webpage corresponding to the hyperlink.

In practical applications, however, a user may probably not click a hyperlink when an instant message received or transmitted by the user comprises the hyperlink. For example, the hyperlink is transmitted by the user to an opposite-end user, so the user will typically not open the hyperlink to check; in another example, when an opposite-end user transmits the hyperlink, the user is in an away or offline state and cannot open the hyperlink to check. In such a case, the server may automatically activate a browser in the back end to access the webpage corresponding to the hyperlink, acquire information of the webpage corresponding to the hyperlink, and generate, according to the information of the webpage corresponding to the hyperlink, a content summary of the webpage corresponding to the hyperlink.

In the embodiment of the present application, the caption information of the webpage may be acquired, from the webpage information of the hyperlink, as the content summary of the webpage corresponding to the hyperlink.

For example, with the URL (http://www.sipo.gov.cn/zlsq/200804/t20080418_383686.html) as an example, a user clicks the URL, the caption information of the opened webpage is "Patent Application", and then the caption information "Patent Application" may be used as the content summary of the webpage corresponding to the hyperlink.

In the embodiment of the present application, moreover, a number of keywords with relatively high frequency of occurrence may be extracted from the information of the webpage corresponding to the hyperlink, and these keywords are used as the content summary of the webpage corresponding to the hyperlink.

Specifically, in some embodiments, for the information of the webpage corresponding to the hyperlink, the noise information, such as navigation links, advertisement links, and dates, is deleted from the webpage to obtain main text of the document corresponding to the webpage, the frequency of occurrence is counted for phrases in the main text of the document. Sentences or phrases with relatively high frequency of occurrence are extracted from each paragraph, respectively, as keywords, and these keywords can reflect the subject content of the webpage and may be used as the content summary of the webpage corresponding to the hyperlink.

For example, with the URL (http://www.sipo.gov.cn/zlsq/200804/t20080418_383686.html) as an example, by using the counting method above, it can be learned that the phrase with relatively high frequency of occurrence on the webpage is "Patent Application". Therefore, the keyword "Patent Application" may be used as the content summary of the webpage corresponding to the hyperlink.

In practical applications, there are many ways to acquire a content summary of a webpage corresponding to a hyperlink, which will not be described in detail herein. Nevertheless, any way capable of acquiring a content summary of a webpage corresponding to a hyperlink according to the prior art can be applied in embodiments of the present application and achieve the invention objective of embodiments of the present application.

It should be noted that, when the non-text information comprised in an instant message is a photo or an audio or video file, the photo or the audio or video file may or may not be a hyperlink.

When a photo or an audio or video file comprised in an instant message is a hyperlink, the server activates a browser to access the webpage on which the photo or the audio or video file is located, and acquire, according to the content of the webpage, a content summary corresponding to the photo or the audio or video file.

For example, assuming that a current user transmits or receives a video clip in a chat window, and the video clip is from a video website, when the user clicks the video, the server activates a browser to open a webpage of the website where the video is located, and the webpage would typically comprise information like the display window of the video, the video title, the brief introduction of the video content, and the video uploading time. The server can directly acquire the video title on the video website as a content summary of the video file; or obtain a content summary of the video file by means of extracting keywords.

In practical applications, the photo or the audio or video file may not be hyperlink information. For example, it is a photo or a video clip taken by a user using a client device. In this case, a server can push a message window of summary acquisition to the user and prompt the user to set a content summary for the non-text information. The server then can receive text information typed in by the user and use the text information as a content summary of the non-text information.

For example, a current user receives or transmits a photo in an IM chat window. Determining that the photo is not hyperlink information, the server pushes a message window to the user and prompts the user to set a corresponding content summary for the photo. According to the content of the current photo, the user types in corresponding text information as a content summary of the photo, and uploads the same to the server via the pushed message window. Upon receiving the text information typed in by the user, the server uses the text information as a content summary of the photo.

For hyperlink information, the above method may be used to acquire a content summary of the hyperlink information. For example, a user receives or transmits a hyperlink in an IM chat window. The server pushes a message window to the user and prompts the user to set a corresponding content summary for the hyperlink. According to the content of the webpage corresponding to the current hyperlink, the user types in corresponding text information as a content summary of the hyperlink, and uploads the same to the server via the pushed message window. Upon receiving the text information typed in by the user, the server uses the text information as a content summary of the hyperlink.

Step 203: the server saves the instant message, and saves the non-text information in the instant message as a data object comprising the non-text information and the content summary of the non-text information.

In the embodiments of the present application, therefore, the server may not save non-text information in the plain text form when the server saves an instant message comprising the non-text information. Instead, the server saves the non-text information as a data object. Since data object is a set of data elements having the same features, the data object can comprise contents in many aspects. In the embodiments of the present application, the data object can comprise the non-text information and the content summary of the non-text information.

The URL (http://www.sipo.gov.cn/zlsq/200804/t20080418_383686.html) is used as an example again. The content summary of the URL is "Patent Application". When the URL is saved, the URL is saved as a data object. The data object not only comprises the URL itself, but also comprises the content summary (Patent Application) corresponding to the URL. When a user needs to acquire the URL from the chat records, the user does not need to provide the URL itself, but just needs to type all or a part of the content of "Patent Application" in a search box.

Another example is that a user transmits a video file, and the content summary of the video file is "birthday records". When the video is saved, the video is saved as a data object, and the data object comprises the video file itself and the content summary (birthday records) of the video file. When a user needs to acquire the video file from the chat records, the user just needs to type all or a part of the content of "birthday records" in a search box.

Therefore, the method for saving IM chat records according to the embodiment of the present application saves non-text information transmitted or received in an IM chat window as a data object comprising the non-text information and the content summary of the non-text information. When a user needs to acquire the non-text information by searching the chat records, he/she just needs to type some words in the content summary of the non-text information into a search box. As a result, the function of searching non-text information in chat records is realized and the problem in the prior art is solved.

Furthermore, each data element in a data object can have different attributes. To achieve better user experience in actual applications, therefore, it is sometimes not desirable to display the content summary in the chat records. Consequently, the method according to the embodiment of the present application can further comprise: setting, in the data object, the display attribute of the non-text information to visible, and the display attribute of the content summary of the non-text information to invisible. With such a setting, when the chat records are opened, only the non-text information is displayed in the message records corresponding to the non-text information, while the content summary of the non-text information is not displayed. When the user types all or a part of the content of the content summary of the non-text information into a search box, however, he/she can still search and obtain the message records where the non-text information is located.

The URL (http://www.sipo.gov.cn/zlsq/200804/t20080418_383686.html) is used as an example again for description. When the URL is saved, the display attribute of the URL is set to visible, and the display attribute of the content summary (Patent Application) of the URL is set to invisible. When the chat records are opened, only the URL itself is displayed in the message records corresponding to the URL, while the content summary of the URL is not displayed. When the user types all or a part of the content of the "Patent Application" into a search box, however, he/she can still search and obtain the message records where the URL is located.

In another example, when a video file is saved, the display attribute of the video file is set to visible, and the display attribute of the content summary of the video file is set to invisible. When the chat records are opened, only the video file itself is displayed in the message records corresponding to the video file, while the content summary of the video file is not displayed. When the user types all or a part of the content of the content summary of the video file into a search box, however, he/she can still search and obtain the message records where the video file is located.

As a result, while the function of searching non-text information in instant messages is realized, the original look of the instant messages transmitted or received by a user at a chat window can still be maintained in the message records of the chat records, which enhances the user experience.

Corresponding to the embodiments of the method for saving IM chat records according to the present application, the present application further provides embodiments of a device and a server for saving IM chat records.

Figure 3:
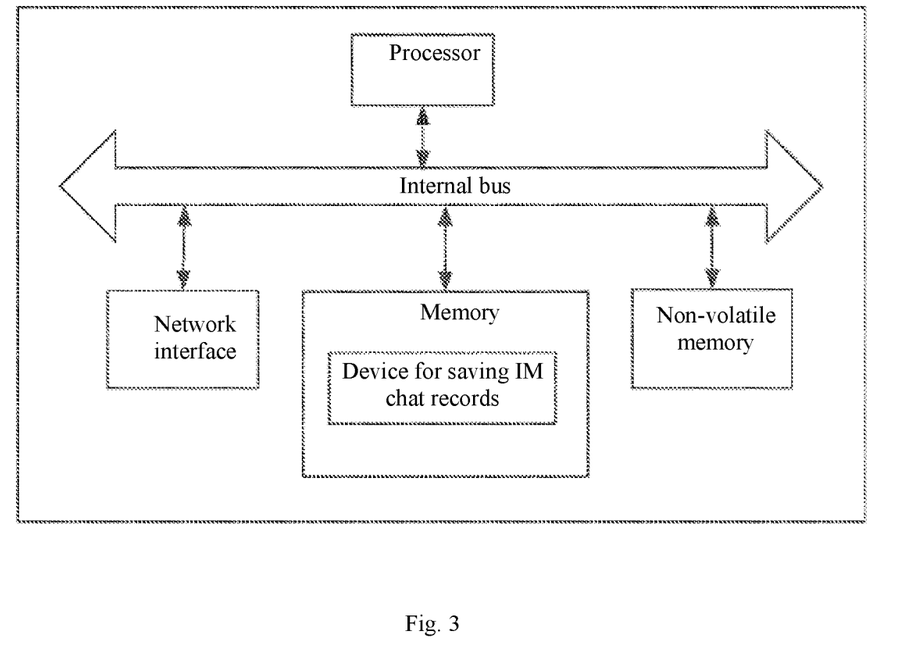
FIG. 3 illustrates a hardware structure of an apparatus in which a device for saving IM chat records according to the present application is disposed.

The embodiments of the device for saving IM chat records according to the present application can be deployed or applied on a server. The device embodiment may be implemented by means of software, or by means of hardware or a combination of software and hardware. With software implementation as an example, the device may include computer program instructions in a non-volatile memory, which can be read by a processor of an apparatus into a memory and executed by the processor. The execution causes the apparatus to perform the methods as described above. From a hardware level, FIG. 3 illustrates a hardware structure of an apparatus in which the device for saving IM chat records according to the present application is disposed or implemented. In addition to the processor, memory, network interface, and non-volatile memory shown in FIG. 3, the apparatus in which the device is disposed according to the embodiment may further comprise, usually according to actual functions of the apparatus, other hardware. For example, a client device may comprise a camera, a touch-screen, and a communication assembly, and a server may comprise a chip for processing messages.

Figure 4:
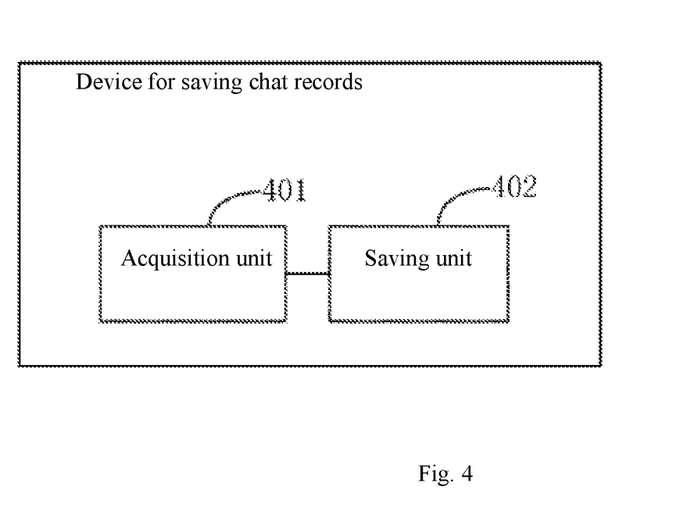
FIG. 4 is a block diagram of an embodiment of the device for saving IM chat records according to the present application.

FIG. 4 illustrates a block diagram of an embodiment of the device for saving IM chat records according to the present application. The device for saving chat records can be run or applied on a server. The device may comprise an acquisition unit 401 and a saving unit 402.

The acquisition unit 401 is configured to acquire, when an instant message transmitted or received by a current IM chat window comprises non-text information, a content summary of the non-text information. The saving unit 402 is configured to save the instant message, and save the non-text information as a data object comprising the non-text information and the content summary of the non-text information.

In one embodiment, the acquisition unit 401 may comprise: an activation sub-unit and a generation sub-unit. The activation sub-unit is configured to activate, when the non-text information is a hyperlink, a browser to access the webpage corresponding to the hyperlink. The generation sub-unit is configured to generate, according to the information of the webpage corresponding to the hyperlink, a content summary of the webpage corresponding to the hyperlink.

In one embodiment, the generation sub-unit may comprise: a caption acquisition sub-unit and a keyword acquisition sub-unit. The caption acquisition sub-unit is configured to acquire the caption information of the webpage corresponding to the hyperlink as the content summary of the webpage corresponding to the hyperlink. The keyword acquisition sub-unit is configured to extract at least one keyword with relatively high frequency of occurrence from the information of the webpage corresponding to the hyperlink, and use the keyword as the content summary of the webpage corresponding to the hyperlink.

In one embodiment, the acquisition unit 402 may comprise: a prompt sub-unit and a receiving sub-unit. The prompt sub-unit is configured to prompt a user to set a content summary for the non-text information. The receiving sub-unit is configured to receive text information typed in by the user and use the text information as a content summary of the non-text information.

In another embodiment, the device may further comprise a setting unit. The setting unit is configured to set, in the data object, the display attribute of the non-text information to visible, and the display attribute of the content summary of the non-text information to invisible.

With respect to the implementation process of functions and roles of all units in the device above, refer to the implementation process of corresponding steps in the methods described above for details, which will not be repeated herein.

Since embodiments of the device substantially correspond to the embodiments of the method, reference can be made to the description of the relevant part of the embodiments of the method. The embodiments of the device described above are merely exemplary, wherein units described as separate parts may or may not be physically separated, and parts illustrated as units may or may not be physical units, namely they may be located at one place or may be distributed over a plurality of network units. Some or all of the modules may be selected, according to actual need, to achieve the goal of the present application, which can be understood and implemented by those skilled in the art without inventive effort.

The present application further provides a server, comprising a processor; and a memory for storing instructions executable by the processor. The processor is configured to, when an instant message transmitted or received by an IM chat window comprises non-text information, acquire a content summary of the non-text information; save the instant message, and save the non-text information as a data object comprising the non-text information and the content summary of the non-text information.

In an embodiment of the present application, when an instant message transmitted or received by an IM chat window comprises non-text information, a content summary of the non-text information is acquired; the non-text information is saved as a data object, and the data object comprises the non-text information and the content summary of the non-text information. When a user needs to acquire the non-text information by searching the chat records, he/she just needs to type some words in the content summary of the non-text information into a search box. As a result, the function of searching non-text information in chat records is realized and the problem in the prior art is solved.

All the embodiments in this specification are described in a progressive manner, each embodiment focuses on the differences from the other embodiments, and reference may be made to each other for the same or similar parts of the embodiments.

A person skilled in the art can understand that, various exemplary logic blocks, units, modules, circuits, and algorithm steps described herein may be implemented as specialized electronic hardware, computer software, or a combination of electronic hardware and computer software. For examples, the steps and modules/units may be performed or implemented by one or more processors executing software instructions stored in the computer-readable storage medium to perform the specialized functions of the steps and modules/units.

The flowcharts and block diagrams in the accompanying drawings show system architectures, functions, and operations of possible implementations of the system and method according to multiple embodiments of the present invention. Each block in the flowchart or block diagram may represent one module/unit, one program segment, or a part of code, where the module/unit, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

Embodiments of the present disclosure may take the form of a computer program product embodied in one or more tangible and/or non-transitory computer-readable storage media containing computer-readable instructions (e.g., program codes). The computer-readable instructions, when executed by one or more processors, cause the one or more processors to implement the steps and units/modules disclosed in the disclosure. The computer-readable storage medium may include volatile or non-volatile, magnetic, semiconductor, optical, removable, non-removable, or other types of computer-readable storage medium or computer-readable storage devices. Common forms of non-transitory computer-readable storage medium include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The computer-readable instructions may also be loaded onto a computer device (for example, a personal computer (PC), a server, a mobile device (e.g., smart phone), or a tablet device) and when the computer device executes the computer-readable instructions, for example, by one or more processors of the computer device, the computer device performs a series of operational steps/functions to implement the methods, functions, and units/modules illustrated and described in the flow diagrams and/or the block diagrams in this disclosure. In a typical configuration, a computer device includes one or more processors, an input/output interface, a network interface, and a memory. The memory may include any form of storage medium as discussed above. The memory can store the computer-readable instructions that can be executed by the processor in the computer.

After considering the description and practicing the invention disclosed herein, those skilled in the art would easily arrive at other implementations of the present application. The present application intends to encompass any variation, use or adaptive change of the present application, and these variations, uses or adaptive changes follow general principles of the present application and comprise common general knowledge or common technical means in the art that are not disclosed in the present application. The description and embodiments are merely exemplary, and the true scope and spirit of the present application are subject to the appended claims.

It should be understood that the present application is not limited to the precise structure described above and illustrated in the accompanying drawings, and moreover, various modifications and variations may be made without departing from its scope. The scope of the present application shall be subject only to the appended claims.

The invention claimed is:

1. A method for saving IM chat records comprising:
when an instant message transmitted or received by an IM chat window comprises non-text information, acquiring a content summary of the non-text information;
determining whether the non-text information comprises a hyperlink;
in response to determining that the non-text information comprises a hyperlink:
activating a browser to access a webpage corresponding to the hyperlink;
extracting at least one phrase with a frequency of occurrence greater than that of other phrases from the webpage corresponding to the hyperlink;
using the at least one phrase as the content summary of the webpage corresponding to the hyperlink;
acquiring, in response to determining that the non-text information does not comprise a hyperlink, the content summary based on typed text information;
saving the non-text information as a data object comprising the non-text information, a display attribute of the non-text information, the content summary of the non-text information, and a display attribute of the content summary of the non-text information; and
setting, in the data object, the display attribute of the non-text information to visible, and the display attribute of the content summary of the non-text information to invisible.

2. The method according to claim 1, wherein, in response to determining that the non-text information comprises a hyperlink, the method further comprises:
acquiring caption information of the webpage corresponding to the hyperlink; and
adding the caption information to the content summary of the webpage corresponding to the hyperlink.

3. The method according to claim 1, wherein the acquiring, in response to determining that the non-text information does not comprise a hyperlink, the content summary based on typed text information comprises:
prompting a user to set the content summary for the non-text information; and
receiving text information typed in by the user and using the text information as the content summary of the non-text information.

4. A device for saving IM chat records comprising one or more processors and one or more non-transitory computer-readable memories coupled to the one or more processors and configured with instructions executable by the one or more processors to cause the device to perform operations comprising:
acquiring, when an instant message transmitted or received by an IM chat window comprises non-text information, a content summary of the non-text information;
determining whether the non-text information comprises a hyperlink;
in response to determining that the non-text information comprises a hyperlink:
activating a browser to access a webpage corresponding to the hyperlink;
extracting at least one phrase with a frequency of occurrence greater than that of other phrases from the webpage corresponding to the hyperlink;
using the at least one phrase as the content summary of the webpage corresponding to the hyperlink;
acquiring, in response to determining that the non-text information does not comprise a hyperlink, the content summary based on typed text information;
saving the non-text information as a data object comprising the non-text information, a display attribute of the non-text information, the content summary of the non-text information, and a display attribute of the content summary of the non-text information; and
setting, in the data object, the display attribute of the non-text information to visible, and the display attribute of the content summary of the non-text information to invisible.

5. The device for saving IM chat records according to claim 4, wherein, in response to determining that the non-text information comprises a hyperlink, the operations further comprise:
acquiring caption information of the webpage corresponding to the hyperlink; and
adding the caption information to the content summary of the webpage corresponding to the hyperlink.

6. The device for saving IM chat records according to claim 4, wherein the acquiring, in response to determining that the non-text information does not comprise a hyperlink, the content summary based on typed text information comprises:
prompting a user to set the content summary for the non-text information; and
receiving text information typed in by the user and use the text information as the content summary of the non-text information.

7. A non-transitory computer-readable storage media storing instructions that, when executed by a processor, cause the processor to perform a method comprising:
when an instant message transmitted or received by an IM chat window comprises non-text information, acquiring a content summary of the non-text information;
determining whether the non-text information comprises a hyperlink;
in response to determining that the non-text information comprises a hyperlink:
activating a browser to access a webpage corresponding to the hyperlink;
extracting at least one phrase with a frequency of occurrence greater than that of other phrases from the webpage corresponding to the hyperlink;
using the at least one phrase as the content summary of the webpage corresponding to the hyperlink;
acquiring, in response to determining that the non-text information does not comprise a hyperlink, the content summary based on typed text information;
saving the non-text information as a data object comprising the non-text information, a display attribute of the non-text information, the content summary of the non-text information, and a display attribute of the content summary of the non-text information; and
setting, in the data object, the display attribute of the non-text information to visible, and the display attribute of the content summary of the non-text information to invisible.

8. The non-transitory computer-readable storage media according to claim 7, wherein, in response to determining that the non-text information comprises a hyperlink, the method further comprises:
   acquiring caption information of the webpage corresponding to the hyperlink; and
   adding the caption information to the content summary of the webpage corresponding to the hyperlink.

9. The non-transitory computer-readable storage media according to claim 7, wherein the acquiring, in response to determining that the non-text information does not comprise a hyperlink, the content summary based on typed text information comprises:
   prompting a user to set the content summary for the non-text information; and
   receiving text information typed in by the user and using the text information as a content summary of the non-text information.

* * * * *